US012225112B2

(12) United States Patent
Cameron

(10) Patent No.: US 12,225,112 B2
(45) Date of Patent: Feb. 11, 2025

(54) MEDICAL EQUIPMENT, AN AUTHENTICATION SERVER AND METHODS FOR AUTHORIZING A USER ACCESS TO AN EQUIPMENT VIA AN EQUIPMENT USER INTERFACE

(71) Applicant: GAMBRO LUNDIA AB, Lund (SE)

(72) Inventor: Jens Cameron, Lund (SE)

(73) Assignee: Gambro Lundia AB, Lund (SE)

( * ) Notice: Subject to any disclaimer, the term of this patent is extended or adjusted under 35 U.S.C. 154(b) by 73 days.

(21) Appl. No.: 17/757,818

(22) PCT Filed: Dec. 14, 2020

(86) PCT No.: PCT/EP2020/085946
§ 371 (c)(1),
(2) Date: Jun. 21, 2022

(87) PCT Pub. No.: WO2021/122440
PCT Pub. Date: Jun. 24, 2021

(65) Prior Publication Data
US 2024/0031133 A1    Jan. 25, 2024

(30) Foreign Application Priority Data

Dec. 19, 2019 (SE) .................................. 1951502-2

(51) Int. Cl.
| *H04L 29/06* | (2006.01) |
| *H04L 9/08* | (2006.01) |
| *H04L 9/32* | (2006.01) |

(52) U.S. Cl.
CPC .......... *H04L 9/0825* (2013.01); *H04L 9/0844* (2013.01); *H04L 9/3271* (2013.01); *H04L 2209/88* (2013.01)

(58) Field of Classification Search
CPC ... H04L 2209/88; H04L 9/085; H04L 9/0819; H04L 9/0844; H04L 9/3271
See application file for complete search history.

(56) References Cited

U.S. PATENT DOCUMENTS

| 9,980,140 B1 * | 5/2018 | Spencer ................ H04W 12/02 |
| 2015/0207626 A1 * | 7/2015 | Neftel .................... G16H 40/67 |
| | | 713/168 |

(Continued)

FOREIGN PATENT DOCUMENTS

| CN | 107810617 B | 3/2018 |
| JP | 2007-272364 | 10/2007 |
| KR | 20180132233 | 12/2018 |

*Primary Examiner* — Dao Q Ho
(74) *Attorney, Agent, or Firm* — K&L Gates LLP

(57) ABSTRACT

The present disclosure relates to methods for authorizing user access to medical equipment via an equipment user interface. In an example, the method comprises, storing an authority public key of an authority asymmetric key pair and providing, to a user via an equipment user interface, an authorization challenge indicative of an equipment public key of a temporary equipment asymmetric key pair generated in medical equipment. The method further comprises receiving from the equipment user interface, a response code comprising validity information encrypted using a shared key derivable from the authority private key of the authority asymmetric key pair and the provided equipment public key, and authorizing the user access to the medical equipment, upon the validity information decrypted using the same shared key but derived in the medical equipment using the stored authority public key and an equipment private key of the temporary equipment asymmetric key pair, being valid.

8 Claims, 5 Drawing Sheets

(56) References Cited

U.S. PATENT DOCUMENTS

| | | | |
|---|---|---|---|
| 2015/0370983 A1* | 12/2015 | Vial | G16H 40/63 |
| | | | 705/2 |
| 2017/0277831 A1* | 9/2017 | Ruff | A61B 6/485 |
| 2018/0013571 A1* | 1/2018 | Aarnio | H04L 9/3236 |
| 2018/0359085 A1* | 12/2018 | Dervyn | G16H 40/67 |
| 2019/0036688 A1* | 1/2019 | Wasily | H04L 9/3231 |
| 2019/0089533 A1* | 3/2019 | Agnello | H04L 63/0823 |
| 2022/0229894 A1* | 7/2022 | Roy | G06F 21/34 |
| 2023/0108034 A1* | 4/2023 | Fischer | H04L 9/3242 |
| | | | 713/183 |
| 2024/0007308 A1 | 1/2024 | Le Saint et al. | |

* cited by examiner

MEDICAL EQUIPMENT, AN AUTHENTICATION SERVER AND METHODS FOR AUTHORIZING A USER ACCESS TO AN EQUIPMENT VIA AN EQUIPMENT USER INTERFACE

PRIORITY CLAIM

The present application is a National Phase of International Application No. PCT/EP2020/085946, filed 14 Dec. 2020, which claims priority to SE Application No. 1951502-2, filed 19 Dec. 2019. The entire contents of each application are incorporated herein by reference and relied upon.

TECHNICAL FIELD

The present disclosure relates to a medical equipment, to an authentication server and to methods for authorizing a user access to a medical equipment via an equipment user interface. The present disclosure also relates to a computer program and a computer program product implementing the method.

BACKGROUND

Medical equipment, hereafter referred to as simply equipment, typically requires that users, such as medical staff or technicians, are authenticated before they are allowed to access the equipment. If the medical equipment is online, i.e. in communication with a service system, a user may be given access via the service system by simply logging in to the service system.

However, sometimes a user needs to access equipment that is offline the service system. Today offline equipment typically uses hardcoded passcodes (e.g. PINS, passwords or keys) that may be entered via a user interface for authorizing access to users. This type of access authorizing is no longer considered secure for several reasons.

For example, there is always a risk that the passwords are shared between users in an uncontrolled way. The passcode solution also requires an extra production step as each piece of equipment needs to be pre-programmed with an individual passcode. On the other hand, if the PINs or passwords are lost, it is not possible to log in at all. Therefore, infrastructure is required to maintain a secure database with passcodes for all equipment, which requires an administrative effort.

Furthermore, anonymous passcodes cannot give an audit on who accessed a particular equipment unless each passcode is used by a single user. However, having multiple user's IDs and passcode on each equipment requires a lot of maintenance when users change.

Another way to identify users would be to use one-time-passwords. However, one-time-passwords require some kind of synchronization, either by the one-time password order number, or by time synchronization between the medical equipment and the password generator. However, typically neither of these synchronization options is really manageable. For order-based one-time passwords without user ID, all users must communicate back to the password generator, which password was most recently used on each respective equipment, which is not feasible. Order-based one-time passwords with user ID require maintenance of a user database on each offline equipment, as described above. Time-based one-time passwords are also not feasible, as it cannot be guaranteed that the clock of the medical equipment is synchronized with the time of the password generator.

Note also that technicians may be external to the clinic and thus not able to be authenticated through the hospital's IT system, even when the medical equipment is connected to a service system.

Consequently, there is a need for improved ways of authorizing users' access to equipment.

SUMMARY

It is an object of the disclosure to alleviate at least some of the drawbacks with existing solutions. It is a still further object to provide a way to authorize users access in a secure way, which does not require configuring the equipment with any individual information. In particular it is an object to provide a solution that eliminates the need to configure individual passcodes in medical equipment.

According to a first aspect the disclosure proposes a method, for use in a medical equipment, for authorizing a user access to a medical equipment via an equipment user interface. The method comprises, storing an authority public key of an authority asymmetric key pair associated with an authentication server and providing, to the user via the equipment user interface, an authorization challenge indicative of an equipment public key of a temporary equipment asymmetric key pair generated in the medical equipment. The method further comprises receiving from the user via the equipment user interface, a response code comprising validity information encrypted using a shared key derivable from the authority private key of the authority asymmetric key pair and the provided equipment public key, and authorizing the user access to the medical equipment, upon the validity information decrypted using the same shared key but derived in the medical equipment using the stored authority public key and an equipment private key of the temporary equipment asymmetric key pair, being valid. The proposed method enables authorizing a user access to an offline user equipment via a user interface, without use of any preconfigured passcode. In practice this means that all users that are authorized by an authentication server, may obtain a passcode from the authentication server and may thereby access the medical equipment. Hence, it is the authentication server that controls who is authorized to access the medical equipment. By using one public key common to all equipment, an individualization step in production may be eliminated. The method also eliminates the need for a database of per-equipment private or symmetric keys and all problems that might occur when replacing hardware in the equipment and thereby a new individual key. Finally, the method does not require that the clocks of the medical equipment and the authentication server are synchronized.

In some embodiments, the user interface is a human-machine interface, or a machine-machine interface configured for communication with a user device of the user. Hence, the user may communicate the challenge and the response manually or via a user device such as a wristband, a smartphone or a portable data storage device such as a USB stick.

In some embodiments, the authorizing comprises authorizing the user different levels of access depending on information comprised in the response code. Hence, one single method may be used for different type of users that would normally need different passcodes. Instead the level of access is handled by the authentication server. In some embodiments, the authorizing comprises authorization for the user to at least one of; authorizing certain access to one or more sessions, unlock the medical equipment for certain usage, authorize temporary non-ordinary use.

In some embodiments, the authorizing comprises authorizing access during a certain time period. Hence, the authorization to access the equipment may be limited for use one single time, or a few times. Furthermore, it might be limited in time.

In some embodiments, the method comprises receiving user input initiating authorization of access to the user. Thus, the authorization may be started by a user that for example, presses a button on the medical equipment.

In some embodiments, the method comprises annulling the temporary equipment asymmetric key pair. Thereby, it is assured that the temporary key is not valid after one use or after a certain time. Hence, for the next authorization a new temporary equipment asymmetric key pair must be created. This enhances security.

In some embodiments, the method comprises that the medical equipment is offline the authentication server. Hence, the method may be used even on an offline medical equipment.

According to a second aspect, the disclosure relates to a method, for use in an authentication server, for authorizing a user access to a medical equipment via a server user interface. The method comprises storing an authority private key of an authority asymmetric key pair associated with the authentication server and authenticating the user. The method further comprises receiving, from a user via the server user interface, an authorization challenge indicative of an equipment public key of a temporary equipment asymmetric key pair associated with the medical equipment, and providing to the user via the server user interface, a response code comprising validity information encrypted using a shared key, wherein the shared key is derived in the authentication server using the stored authority private key and the equipment public key. The method enables creating a response code, that may be used to unlock a medical equipment based on an authentication of a user in the authentication server. Hence, all user authentication may be handled in one place i.e. in authentication server. The authentication server will then act on behalf of the user when access to a medical equipment is required. In other words, the proposed method enables individual authentication per user, logged in a central system (i.e. cannot be cleared in the medical equipment), independent of network infrastructure.

In practice this means that once a user is added in the authentication server, the user may be granted access to any medical equipment controlled by the authentication server, i.e. all medical equipment that store the authority public key of the authority asymmetric key pair and that are configured to perform the method according to the first aspect. The method allows the remote authentication server to manage users, authorization and de-authorization e.g. when staff changes. Changes are immediate and require no maintenance of each individual equipment.

In some embodiments, the server interface is a human-machine interface, or a machine-machine interface configured for communication with a user device of the user. Hence, the user may communicate the challenge and the response manually or via a user device such as a wristband or a smartphone.

In some embodiments, the determining comprises determining the response code based on at least one of; an authorization level of the user, a time parameter and a location of the user. Hence, the authentication server may select what type of access to grant based on different parameters. For example, medical staff and technicians may be given different types of access. Also, some users might only be allowed to access the medical equipment at certain times, or in certain places.

In some embodiments, the method comprises logging information associated with the authentication. As the authentication server knows which user has been granted access to which medical equipment and when, it is possible to generate a log of all access provided, which may be useful in many situations.

In some embodiments, the authority and equipment asymmetric key pairs are generated such that the same shared key is derived when using the private key of one of the asymmetric key pairs with the public key of the other asymmetric key pair as the other way around. In some embodiments, the shared key is derived using a Diffie-Hellman function. In some embodiments, the authority and equipment asymmetric key pairs are generated using Elliptic Curve Cryptography, ECC, or Rivest-Shamir-Adleman, RSA.

In some embodiments, the validity information comprises at least one of; a device identifier of the medical equipment, an address of the medical equipment, a pre-defined data sequence and a data sequence determined using a pre-defined rule. Hence, in practice any "string" known by the medical equipment may be used. In some embodiments, the validity information comprises a control sum. Using a control sum, thus a checksum, may be beneficial when the response code is entered manually as it is typically shorter.

According to a third aspect, the disclosure relates to a corresponding medical equipment comprising an equipment user interface and a control arrangement. The control arrangement is configured to store an authority public key of an authority asymmetric key pair associated with an authentication server and to provide, to the user via the equipment user interface, an authorization challenge indicative of an equipment public key of a temporary equipment asymmetric key pair generated in the medical equipment. The control arrangement is further configured to receive from the user, via the equipment user interface, a response code comprising validity information encrypted using a shared key. The shared key is derivable from the authority private key of the authority asymmetric key pair and the provided equipment public key. The control arrangement is further configured to authorize the user access to the medical equipment, upon the validity information decrypted using the same shared key but derived in the medical equipment using the stored authority public key and an equipment private key of the temporary equipment asymmetric key pair, being valid.

According to a fourth aspect, the disclosure relates to a corresponding authentication server comprising a server user interface. The authentication server is configured to store an authority private key of an authority asymmetric key pair associated with the authentication server and to authenticate the user. Furthermore, the authentication server is configured to receive, from a user via the server user interface, an authorization challenge indicative of an equipment public key of a temporary equipment asymmetric key pair associated with the medical equipment. The authentication server is further configured to provide to the user via the server user interface, a response code comprising validity information encrypted using a shared key, wherein the shared key is derived in the authentication server using the stored authority private key and the equipment public key.

According to a fifth aspect, the disclosure relates to a computer program, characterized in code means, which when run in a computer causes the computer to execute the methods according to the first or second aspects.

According to a sixth aspect, the disclosure relates to computer program product including a computer readable medium and a computer program, wherein said computer program is included in the computer readable medium.

According to a seventh aspect, the disclosure relates to system comprising the medical equipment and the authentication server.

BRIEF DESCRIPTION OF THE FIGURES

Embodiments of the disclosure are described in more detail with reference to attached figures illustrating examples of embodiments of the disclosure in which.

DETAILED DESCRIPTION

Figure 1A:
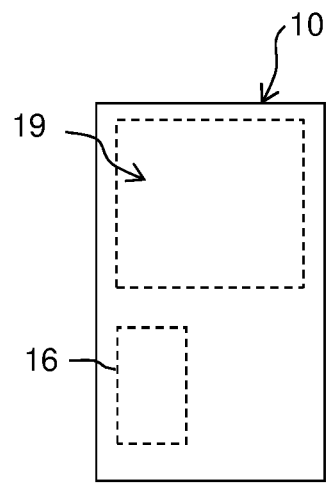
FIG. 1a illustrates a conceptual medical equipment.

The proposed solution involves two parties: a medical equipment and a response generator a.k.a. authentication server. The authentication server may for example be a remotely accessible system, or it may be a secured server inside an organization (e.g. inside a hospital). The authentication server is able to securely store an authority private key $d_A$ and perform the proposed challenge-response algorithm.

The proposed technique solves the above-mentioned problems using asymmetric a.k.a. "public key" cryptography, specifically key exchange algorithms. Public key cryptography is based on using key pairs where one key is used to encrypt data and the other is used to decrypt data. Data cannot be decrypted by the encryption key and data cannot be encrypted by the decryption key (in a meaningful way). When two parties each has one private key d and one public key Q, the parties can compute the same shared key K by combining their own private key d with the other parts public key Q.

As discussed above, configuring individual encryption keys on each piece of medical equipment require an extra production step and also infrastructure to maintain the database of such encryption keys. It can also cause problems when changing hardware in equipment, e.g. replacing electronic boards, where the encryption key is stored. Therefore, a solution is proposed, which does not require any individual keys to be stored in the medical equipment. Thus, in the proposed solution the medical equipment does not contain any secret that, when disclosed, would allow untrusted users access.

The proposed solution uses two pairs of asymmetric keys, one temporary equipment asymmetric key pair and one authority asymmetric key pair. The authority asymmetric key pair is pre-generated. All medical equipment produced by a manufacturer is pre-configured or programmed with the authority public key $Q_B$ of the authority asymmetric key pair. The authority public key $Q_B$ does not need to be secret. However, the authority public key $Q_B$ must be stored in a way such that it cannot be changed, at least not by any untrusted part.

The authority private key $d_B$ of the authority asymmetric key pair is securely stored in an authentication server. The authority private key $d_B$ is never exposed. Furthermore, the authority private key $d_B$ does not change but the same key is used e.g. by a manufacturer to enable access to all its medical equipment. The authority private key $d_B$, that corresponds to the authority public key $Q_B$ stored in the medical equipment, is required to create a response code required to access the equipment. Thus, a user that wants to access a medical equipment needs to authenticate him- or herself at the authentication server to get a valid response code, that may be used to access the medical equipment. This means that the medical equipment does not know which user that accessed the medical equipment. However, users may still be traced in the authentication server, by logging when the response codes were created and to which user, and possibly also to which medical equipment.

The temporary equipment asymmetric key pair is generated in the medical equipment each time a user wants to access the medical equipment. The temporary equipment asymmetric key pair is basically used to verify that the response code has been issued for this particular medical equipment. The temporary equipment asymmetric key pair is generated using the same algorithm, as was used to generate the authority asymmetric key pair. After one use, the temporary equipment asymmetric key pair is not valid anymore. Hence, a new temporary equipment asymmetric key pair must be generated.

The authority asymmetric key pair is used together with the temporary equipment asymmetric key pair to authorize access to the medical equipment as will be described in the following. However, the mathematical algorithms for asymmetric encryptions and key exchange are also not part of the disclosure and the proposed solution does not depend on any specific algorithm, although some may be better fit for the purpose than others for purely practical reasons.

In the following a medical equipment, an authentication server and methods for authorizing a user access to a medical equipment via an equipment user interface will be described. The proposed technique is applicable to any medical equipment where it is required, or desirable, to control user access. Medical equipment includes but is not limited to; infusion pumps for fluids (e.g. nutrition fluids, intravenous therapy fluids and oncology drugs), water purifying apparatuses and medical imaging devices etc.

FIG. 1a illustrates a conceptual medical equipment 10 in which the proposed technique may be implemented. The medical equipment 10 is for example a medical machine, such as a dialysis machine. Alternatively, the medical equipment is a smaller medical device, such as an infusion pump. The medical equipment 10 may comprise a plurality of individual devices that are connected to each other. The proposed technique may then be used to control user access to one or more of these devices. In principle, the medical equipment 10 may be any equipment intended for medical use.

The medical equipment 10 is configured to perform any medical procedure. The medical equipment 10 is not connected to any remote system that may grant access to the medical equipment 10. Hence, the medical equipment is offline. In particular it is offline an authorisation system 20 (FIG. 2b) that holds the authority private key $d_B$ which is required to access the medical equipment 10.

In the illustrated simplified example, the medical equipment 10 comprises an equipment user interface 19 and a control arrangement 16. The medical equipment also comprises components required to perform the medical procedure (not shown). The equipment user interface 19 enables a user to communicate information to and/or from the medical equipment. The equipment user interface 19 comprises for example a display and buttons or a touchscreen.

Figure 1B:
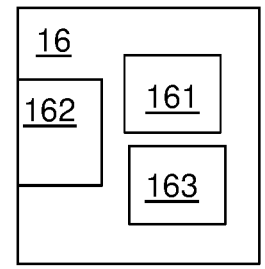
FIG. 1b illustrates a control arrangement of the medical equipment of FIG. 1a in more detail.

FIG. 1b illustrates a control arrangement 16 of any of the example medical equipment of FIG. 1a in more detail. The control arrangement 16 comprises a processor 161 and memory 163. The processor 161 may be any commercially available processing device, such as a CPU, DSP, a microprocessor, an FPGA, an ASIC, or any other electronic programmable logic device, or a combination thereof.

The control arrangement 16 may also comprise a communication interface 162 is configured to enable communication with other devices or systems, such as a local server or a remote service system. The communication may be wireless and/or wired. Wired communication may be performed using a wired Ethernet connection, RS-232, RS-485 or UART. Wireless communication may be performed via any of Bluetooth™, WiFi™, Zigbee®, Z-Wave®, wireless Universal Serial Bus ("USB"), or infrared protocols, or via any other suitable wireless communication technology. The short-range communication interface 162 is for example a Bluetooth™ chip, configured to be controlled by the processor 161.

The memory 163 may include non-volatile memory or volatile memory, or a combination thereof, including but not limited to ROM, PROM, EEPROM, flash memory, removable memory, RAM, DRAM, SRAM, cache memory, hard drive, storage medium, etc. The memory 163 stores software code for execution by the processor 161. The software code is configured to control the medical equipment 10 to perform e.g. the medical procedure and for allowing a user access to the medical equipment.

The processor 161 and memory 163 are "separate" in the sense that they are individually operable units, while they may or may not be located in any combination on a common substrate, e.g. in an integrated circuit. For simplicity, the control arrangement 16 of FIG. 2a is illustrated as comprising only one processor 161, and memory 163. However, it must be appreciated that the control arrangement 16 may comprise a set of processors comprising one or more processors 161 and that the memory 163 may be implemented by one or several memory devices.

The control arrangement 16 is configured to control the operation of the medical equipment 10 e.g. to perform the intended medical procedure of the medical equipment 10. The control arrangement 16 is also configured to control access to the medical equipment 10.

Figure 2:
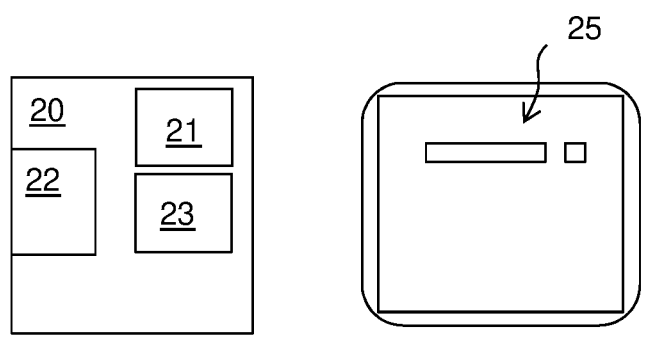
FIG. 2 illustrates an authentication server.

FIG. 2 illustrates an authentication server 20. The authentication server is a control arrangement configured to authenticate users access to medical equipment. The authentication server 20 may be located on-site or off-site. The authentication server 20 is in some embodiments integrated with another system such as a hospital IT system or a manufacturer service system. The authentication server 20 may either be one physical device, such as a computer, or it may be a computer system running on several physical computers e.g. in a computer cloud. In some embodiments the authentication server 20 is a local server for example at a hospital where the medical equipment 10 is used. The authentication server 20 comprises a server user interface 25. The authentication server 20 comprises a processor 21, a communication interface 22 and memory 23. The processor 21 may be any commercially available processing device, such as a CPU, DSP, a microprocessor, an FPGA, an ASIC, or any other electronic programmable logic device, or a combination thereof.

The processor 21 and memory 23 are "separate" in the sense that they are individually operable units, while they may or may not be located in any combination on a common substrate, e.g. in an integrated circuit. For simplicity, the authentication server 20 of FIG. 2b is illustrated as comprising only one processor 21, and memory 23. However, it must be appreciated that the authentication server 20 may comprise a set of processors comprising one or more processors 21 and that the memory 23 may be implemented by one or several memory devices. The communication interface 22 is an interface that enables communication between the authentication server 20 and other devices, e.g. with remote devices over the internet.

Users may interact with the authentication server 20 via the server user interface 25. The server user interface 25 is configured to enable interaction between the authentication server 20 and a user. In some embodiments the server user interface 25 comprises a software user interface, e.g. a web interface or application programming interface, API. Thus, the server user interface 25 may be rendered on a device external from the authentication server 20, such as on an external display or on a user device (e.g. a personal computer). The server interface 25 may even be generated on a remote (i.e. off-site) device which accesses the server user interface 25 via the communication interface 22. In some embodiments the server user interface 25 is a graphical user interface that allows a user to interact with the authentication server 20 through graphical icons.

In some embodiments the server user interface 25 comprises a hardware interface that enables the user to interact with the authentication server 20 using physical components such as a keyboard, mouse and/or a display, e.g. a touch screen.

Figure 3:
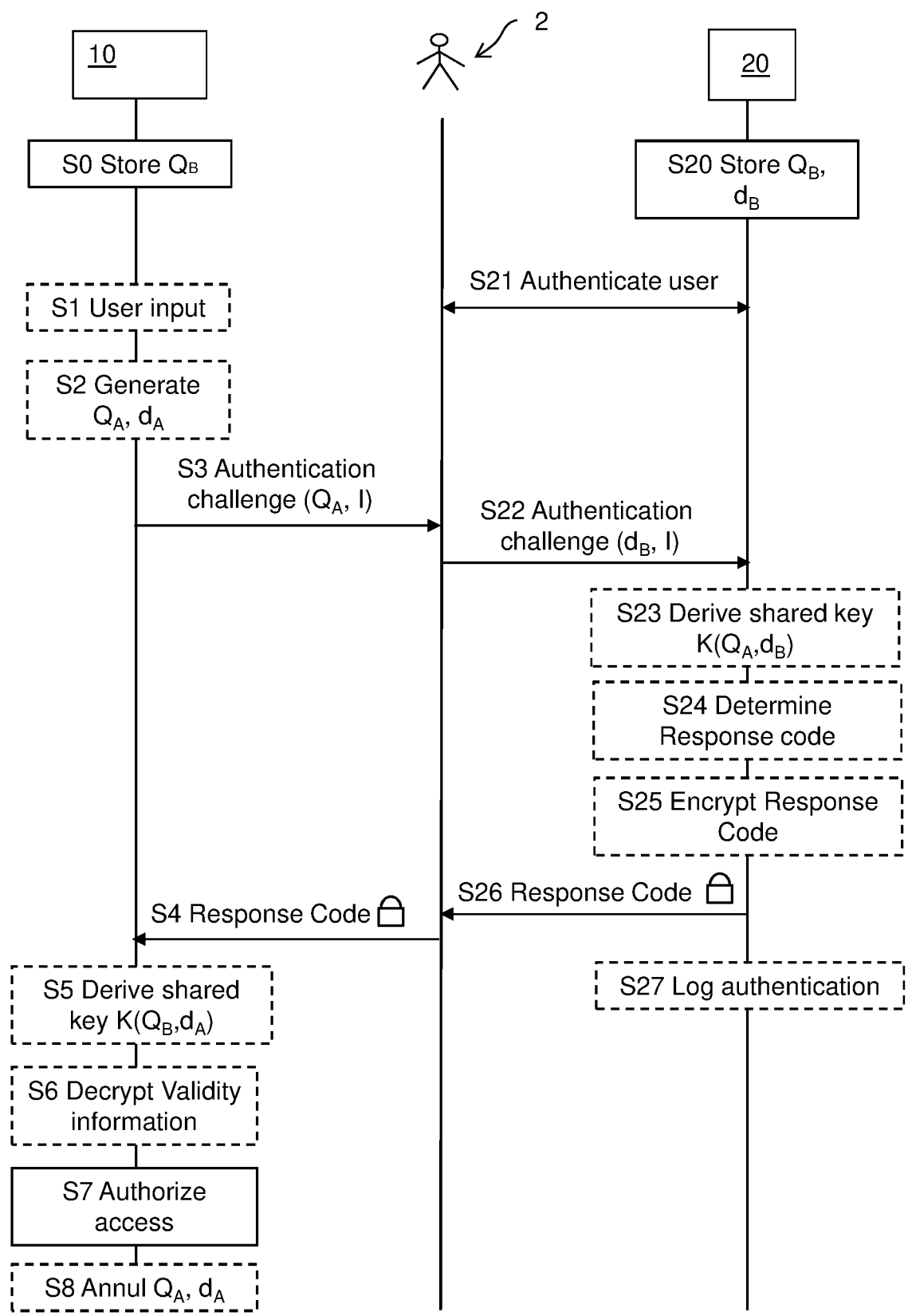
FIG. 3 illustrates signaling between a medical equipment and an authentication server, when performing the methods of FIG. 4 and FIG. 5.
Figure 4:
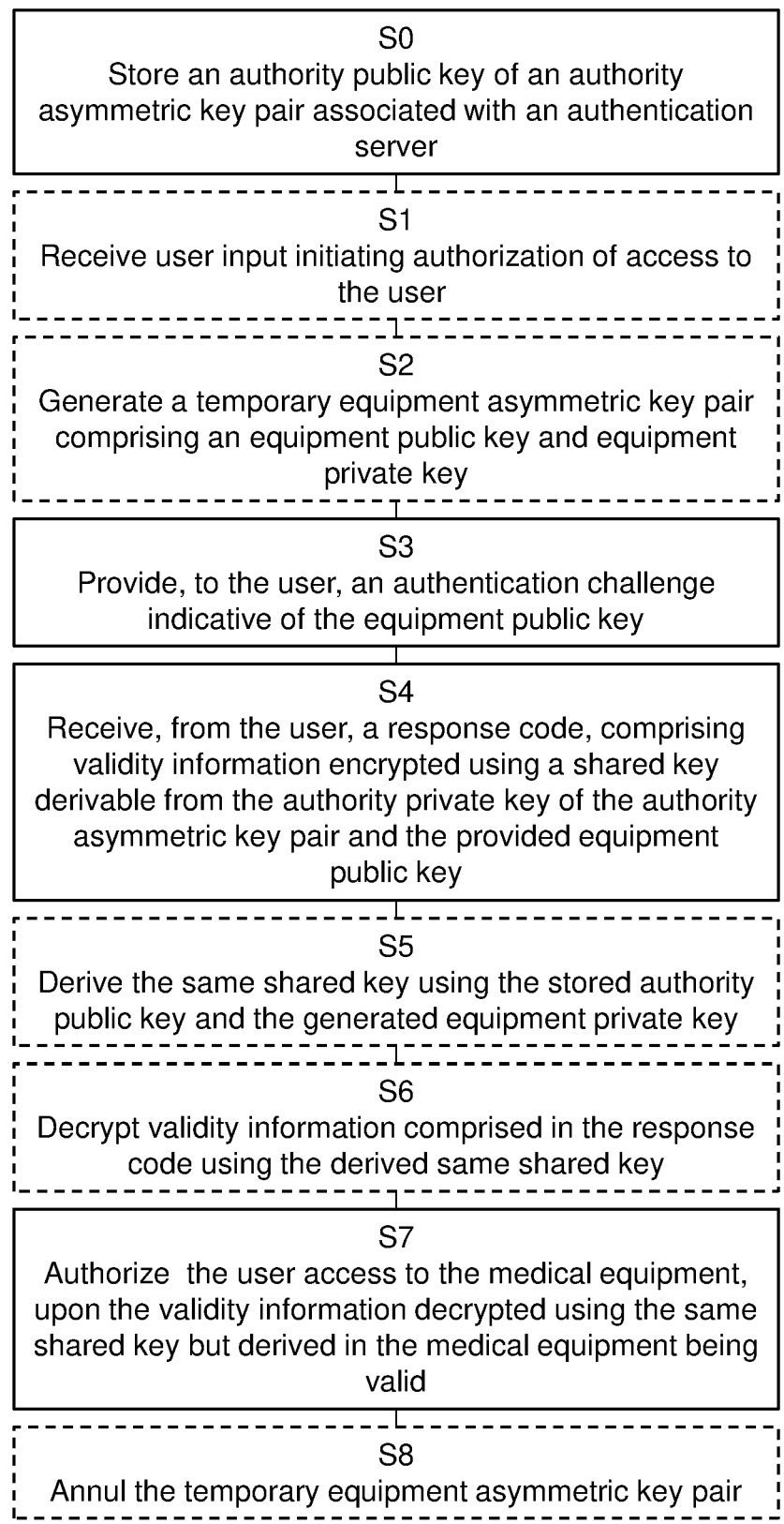
FIG. 4 illustrates a flow chart of a method for use in medical equipment.

A method, for use in a medical equipment 10, for authorizing a user 2 access to the medical equipment 10 via an equipment user interface will now be described with reference to FIG. 3 and FIG. 4. FIG. 3 illustrate signaling between a medical equipment 10 and an authentication server 20, when performing the proposed methods authorizing a user 2 access to the medical equipment 10 via an equipment user interface. FIG. 4 illustrates a flow chart of the method steps performed in the medical equipment 10. That the method is for use in a medical equipment 10 means that the method steps of the method are performed by one or several components in the medical equipment 10, e.g. by the control arrangement 16. The method may be implemented as program code and saved in a memory 163 of the medical equipment 10. The steps of the method may be defined in a computer program, comprising instructions which, when the program is executed by a computer e.g. the control arrangement 16, cause the control arrangement 16 to carry out the method.

The method may be performed at any time when a user wants to access the medical equipment 10 via an equipment user interface 19. Typically, this is the case when the medical equipment 10 is not connected to the internet or at least not to any service system that may grant the user access automatically. In other words, in some embodiments, the medical equipment 10 is offline the authentication server 20. Hence, access needs to be provided using the equipment user interface 19. The medical equipment may have different types of equipment user interfaces 19, as described above. In some embodiments, the equipment user interface 19 is a human-machine interface. A human-machine interface is an interface that allow user actions to be translated as signals for machines that, in turn, provide the required result to the user. A human-machine interface comprises for example, buttons, one or more display, microphone, speakers etc.

In some embodiments, the equipment user interface 19 is machine-machine interface configured for communication with a user device of the user. A user device is e.g. a smartphone or a wearable device. The user device may for example be configured to read an optical or wireless signal. For example, the user device may be configured to read a sequence of symbol or a QR code. In some embodiments the user device is a portable data storage device such as a USB stick. Hence, the user may retrieve data to the portable data storage from the equipment user interface 19 and then transfer it further to the server user interface 25.

As mentioned above, it is a prerequisite for the proposed solution that the medical equipment 10 stores an authority public key, $Q_B$ of an authority asymmetric key pair associated with an authentication server 20. The authority asymmetric key pair is pre-generated in the authentication server 20 using a pre-defined algorithm. There are many algorithms that may be used to generate the key pairs. Some example algorithms are Elliptic Curve Cryptography, ECC, or Rivest-Shamir-Adleman, RSA.

The authority public key $Q_B$ may be configured (i.e. stored) in the medical equipment 10 during manufacturing of the medical equipment 10, or it may be included in the software of the medical equipment 10. In other words, the method comprises storing S0 an authority public key $Q_B$ of an authority asymmetric key pair associated with an authentication server 20. The authority public key $Q_B$ shall be stored such that it is not possible to change or exchange it. This can be done by any known ordinary storage method, for example by hardcoding the authority public key $Q_B$ in software or by storing it in a Read Only Memory, ROM or in a file in an internal file system that is not accessible (at least not writable). In practice the authority public key $Q_B$ may be stored in any component which is difficult to replace and where it may not be replaced.

The authorization of access is for example initiated when a user requests access to the medical equipment via the equipment user interface 19. This is for example done by pressing a button or icon on a display 12 of the medical equipment 10. In other words, in some embodiments, the method comprises receiving S1 user input initiating authorization of access to the user 2. Alternatively, authorization of access is automatically started for example at start-up.

As a response to the user input, or at automated startup, a temporary key pair is generated S2 in the medical equipment 10 using the same algorithm as when generating the authority asymmetric key pair. Hence, the method comprises generating S2 a temporary equipment asymmetric key pair comprising an equipment public key $Q_A$ and equipment private key $d_A$. The authority and equipment asymmetric key pairs are generated such that the same shared key is derived when using the private key d of one of the asymmetric key pairs with the public key Q of the other asymmetric key pair as the other way around.

After the temporary equipment asymmetric key pair has been generated, an authentication challenge is presented to the user. The challenge comprises information that enables the authentication server 20 to obtain the equipment public key $Q_A$. In some embodiments, the challenge comprises or contains the generated equipment public key $Q_A$. The equipment public key $Q_A$ identifies the authorisation session and makes it possible to verify that a response code is intended for a specific challenge. The challenge may also comprise further information, such as equipment identification information that enables the authentication server 20 to identify the medical equipment 10, e.g. a device identifier I or an address. For example, the equipment public key $Q_A$ is presented to the user together with a device identifier e.g. a serial number or Media Access Control (MAC) address. This information is from here denoted "challenge". Presentation can be on-screen and can be human-readable, e.g. a sequence of symbols, or machine readable, e.g. a QR code or a radio signal. The challenge may be relatively short by using an efficient public key cryptographic algorithm like Elliptic Curve Cryptography, ECC. An ECC-160 key is 20 bytes which could be presented in 25 printable characters.

For example, if a device ID is "123456" and the equipment public key $Q_A$ is "36FD A6A2 13DC 2754", then the challenge presented to the user may be "12345636FD A6A213DC2754". In other words, the method comprises providing S3, to the user 2 via the equipment user interface, an authorization challenge indicative of an equipment public key $Q_A$ of a temporary equipment asymmetric key pair generated in the medical equipment 10. Note that the challenge may be unencrypted as it does not comprise any secret information, but only information that is needed to generate a valid response code. However, any other data in the challenge, apart from the equipment public key $Q_A$ may be encrypted with the shared key K, that may be derived by the medical equipment 1 upon receiving the equipment public key $Q_A$.

When the user has received the challenge, he or she needs to obtain a valid response code from an authentication server 20, which holds the authority private key $d_B$. To do this the user authenticates S21 her or himself to the authentication server 20. This could be done directly via the server user interface 25 or through a person to whom the user is known. In the authentication server 20, the user identity and access level are checked. The user then transfers the challenge to the authentication server 20 and the authentication server 20 receives S22 the challenge. For example, the user reads the challenge presented on the display of the medical equipment and types it in the server user interface 25. Alternatively, the user uses a user device, such as a smartphone or USB stick, to transfer the challenge. The challenge includes the equipment public key $Q_A$ which is combined with the system's private key $d_B$ into a shared key $K(Q_A, d_B)$ that is used to encrypt a response code, that is returned to the user. $K(Q_A, d_B)$ here refers to the shared key K when calculated in the authentication server 20 using the function $f(Q_A, d_B)$. In some embodiments, the shared key $K(Q_A, d_B)$ is derived using a Diffie-Hellman function.

Hence, the authentication server 20 analyses the challenge and computes (i.e. generates S23) a shared key $K(Q_A, d_B)$. The authentication server 20 then computes (i.e. determines S24) a response code and encrypts S25 the response code with the shared key $K(Q_A, d_B)$. The response code comprises validity information. The validity information is information that is known by the medical equipment 10 and that the medical equipment 10 can decrypt in order to verify that the correct shared key $K(Q_A, d_B)$ was used. The response code is then presented (i.e. provided S26) to the user, via a server user interface 25. The operations performed by the authentication server 20 to generate a valid response code will be further described in connection to FIG. 5 below.

The user then enters the response code via the equipment user interface 19 of the medical equipment 10. In other words, the method for use in a medical equipment 10 comprises receiving S4 from the user 2 via the equipment user interface 19, a response code comprising validity information encrypted using a shared key $K(Q_A, d_B)$ derivable from the authority private key $d_B$ of the authority asymmetric key pair and the provided equipment public key $Q_A$.

The shared key $K(Q_A, d_B)$ may only be derived by a response generator that has access to the authority private key $d_B$ and the equipment public key $Q_A$ indicated by the challenge. The validity information is a pre-agreed piece of data. Hence, the medical equipment 10 knows what validity information that may be expected. Thus, if the pre-agreed validity information is obtained when decrypting the response code (or part of the response code) using the shared key $K(Q_A, d_B)$ this ensures, beyond reasonable doubt, that the response code originates from a trusted response generator, i.e. authentication server 20 and is intended for the specific challenge.

In some embodiments the validity information comprises a device identifier I of the medical equipment 1 that was provided in the challenge, such as a serial number of the medical equipment 10. In some embodiments the validity information comprises an address of the medical equipment 1 that was provided in the challenge, such as a MAC address of the medical equipment 10. In some embodiments the validity information comprises a pre-defined data sequence, such as "BX" or any pre-agreed text string.

In some embodiments the validity information comprises a data sequence determined using a pre-defined rule. The data sequence may e.g. be a hash or control code computed from information comprised in the challenge. For example, the response code may be a Cyclic Redundancy Check, CRC, of the challenge or of a part of the challenge. The response is encrypted with a symmetric crypto and thus need not be longer than the original message. Length of data in challenge-response transaction is important when the user has to transfer the messages manually.

Thus, the medical equipment 10 combines its temporary equipment private key $d_A$ with the stored authority public key $Q_B$ of the authentication server 20 (i.e. the response generator) into the same shared key $K(Q_B, d_A)$ as used in the authentication server 20 and decrypts S6 the response code, or at least the encrypted validity information. $K(Q_B, d_A)$ here refers to the shared key K when calculated in the medical equipment using the function $g(Q_B, d_A)$.

Thus, the same shared key may be calculated using the function $g(Q_B, d_A)$ or $f(Q_A, d_B)$. Thus, the shared key K may be expressed as:

$$K=g(Q_B,d_A)=f(Q_A,d_B)$$

In other words, the method comprises deriving S5 (i.e. generating) the same shared key $K(Q_B, d_A)$ in the medical equipment 10 using the stored authority public key $Q_B$ and the generated equipment private key $d_A$. Note that the deriving S5 may already have been performed earlier e.g. right after generating S2 the temporary equipment asymmetric key pair. If so, the shared key may also be used to encrypt some information included in the challenge, apart from the equipment public key $D_A$, which is needed by the authorization server 20 to derive the shared key. In some embodiments, the method also comprises decrypting S6 validity information comprised in the response code using the derived same shared key.

If the validity information is valid, then the user is authorized access to the medical equipment 10. In some example embodiments, the medical equipment 10 decrypts the validity information and validates the response code, by comparing the decrypted validity information with the pre-agreed validity information, which is either stored in the medical equipment 10 or alternatively the medical equipment 10 knows how to calculate it. If the response code is valid, i.e. the decrypted validity information is the same as or equal to the pre-agreed validity information, access is granted. In other words, the method comprises authorizing S7 the user 2 access to the medical equipment 10, upon the validity information decrypted using the same shared key $K(Q_B, d_A)$ but derived in the medical equipment 10 using the stored authority public key $Q_B$ and an equipment private key $d_A$ of the temporary equipment asymmetric key pair, being valid.

The response code may contain additional information, e.g. the user's authorization level on the medical equipment 10. For example, medical staff may have one authorization level needed to make the medical equipment 10 to perform the medical procedure. However, technicians may not be authorized to make the medical equipment 10 to perform the medical procedure. However, technicians may be authorized to operate the medical equipment 10 in a test mode, update software, enter service modes or privileged modes etc. Thus, the response code may comprise additional information indicative of which functionality the user may access. In other words, in some embodiments, the authorizing S7 comprises authorizing the user 2 different levels of access depending on information comprised in the response code. In some embodiments, the authorizing comprises authorization the user 2 a certain access level to one or more sessions, wherein one session is e.g. one treatment session or service session. Depending on the access level (e.g. defined by the response code) the user may then perform certain actions such as adjusting clinical limits, adjusting default values, adjusting treatment settings for the session and starting the medical procedure.

In some embodiments, the authorizing comprises authorization for the user 2 to authorize temporary non-ordinary use. Non-ordinary use comprises for example executing a session outside normal limits, for example, turning off certain monitoring or safety system. Another example of non-ordinary use is installing special-purpose software e.g. for a non-clinical demonstration or troubleshooting.

In some embodiments, the authorizing comprises unlocking the medical equipment for certain usage. In other words, the response code may also comprise other information, such as commercial information, that may for example unlock certain functionality in the medical equipment. In this way, the authentication server may control the medical equipment 10. One specific example is that a medical equipment may be unlocked for clinical use if this was previously blocked.

All the examples above are basically based on that the proposed method enables sending authenticated data from the authorization server to the medical equipment 10.

In the response code it is even possible to convey "authority-authenticated" data to the medical equipment 10. That is, it is possible to send data that not even the authenticated user is authorized to enter into the equipment. It can be, for example, an approval for clinical use (if the equipment also has had nonclinical software, for example for demonstration), extended use (e.g. neonatal use for which the medical equipment is not approved in a basic configuration) or a purchase of some commercial option. Thereby, important data might be centrally controlled within the organization, which is more secure than delegating control to individual users.

As mentioned above, the proposed method is typically intended for single use. Hence, the response code might only be valid for a certain time period. The time may be predefined, or it may be defined by information comprised in the response code. The time period may be absolute. For example, it may start at the point in time when the challenge is provided S3 or at the point in time when the response code was first entered. Alternatively, the time period may be determined relative a time in the medical equipment 10, which requires that the clocks of the medical equipment 10 and the authentication server are synchronized. In other words, in some embodiments, the authorizing S7 comprises authorizing access during a certain time period. However, it must be noted that the method does not require synchronized clocks.

In order to increase security, the temporary equipment asymmetric key pair should only be valid for one authentication. Hence, after authorizing the user access the temporary equipment asymmetric key pair should be made invalid. This may alternatively be done after a predetermined time period. In other words, in some embodiments, the method comprises annulling S8 the temporary equipment asymmetric key pair. For example, the temporary key pair is deleted or made invalid in any other way.

Figure 5:
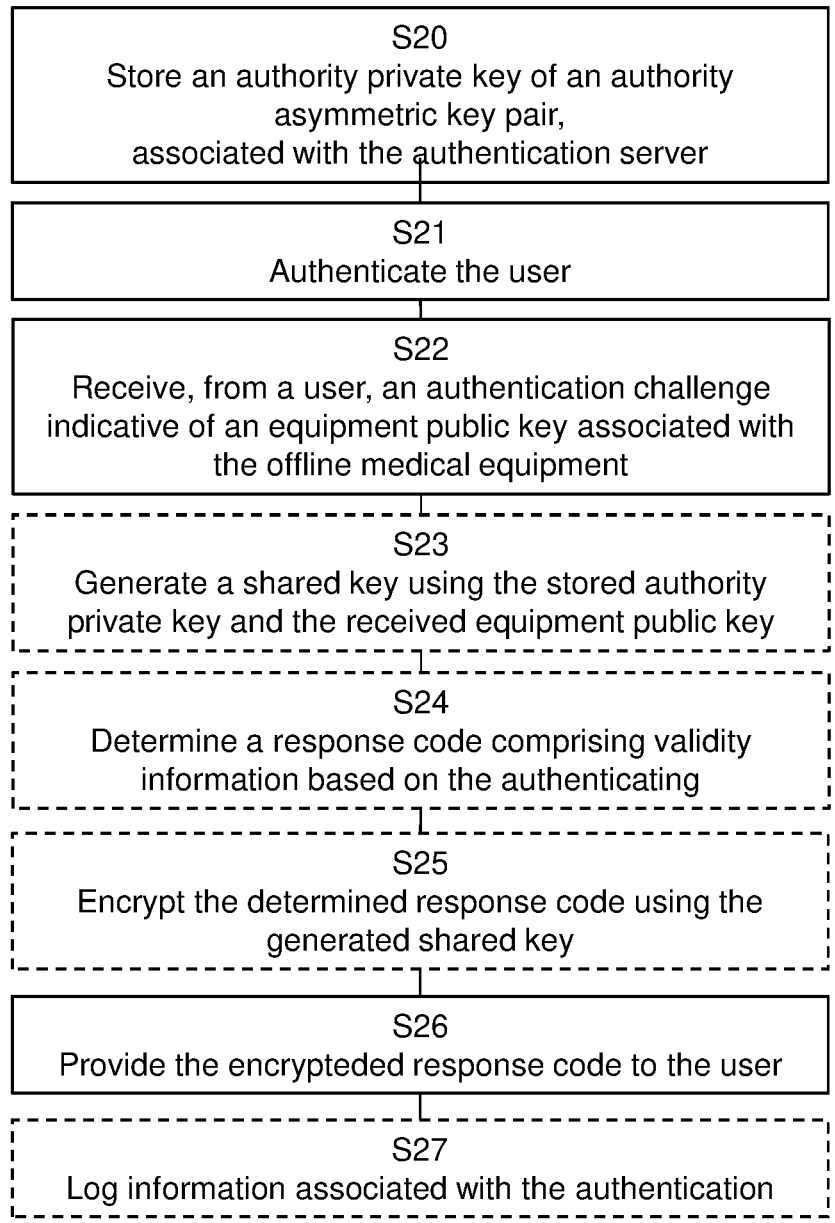
FIG. 5 illustrates a flow chart of a method for use in an authentication server.

FIG. 5 illustrates a flow chart of a corresponding method for use in an authentication server 20. That the method is for use in an authentication server 20 means that the method steps of the method are performed by one or several components in the authentication server 20, for example by the processor 21. The method may be implemented as program code stored in the memory 23 of the authentication server 20. The steps of the method may be defined in a computer program, comprising instructions which, when the program is executed by a computer e.g. the processor 21, cause the computer to carry out the method.

The method is typically performed when a user that wants to access a medical equipment 10 has received a challenge from the medical equipment 10 and needs a valid response code to access the medical equipment 10. This may for example be the case when the medical equipment 10 is not connected to the internet or at least not to any service system that may grant the access automatically. In other words, in some embodiments, the medical equipment 10 is offline the authentication server 20.

The method requires that the user interacts with the authentication server 20 using a server user interface 25. It must be noted that it does not necessarily has to be the same person that is about to access the medical equipment 10. In principle, a technician who wants to access a medical equipment 10 may phone someone who has access to the server user interface 25 of the authentication server 20. The challenge and the response codes may in such a situation be communicated over the phone. This of course requires that the person who has access to the authentication server 20 recognizes the technician and can guarantee that he or she is trusted.

As explained above, the proposed solution is based on the concept that the authentication server 20 stores an authority private key $d_B$. In other words, the method comprises storing S20 an authority private key $d_B$ of an authority asymmetric key pair associated with the authentication server 20. The authentication server 20 may also store an authority public key $Q_B$ as it may be needed to establish secure communication with other devices, which does not store the authority public key $Q_B$. However, it is not required to perform the proposed method.

A user that has got a challenge first has to log in to the authentication server 20. In other words, the user needs to prove his or her identity. This can be done in any conventional way, such as using credentials or more secure authentication methods, such as digital certificates. However, as the authentication server 20 is for example a part of another system such as a hospital IT system or a manufacturer service system, this type of functionality is typically already in place and does anyhow have to be updated with recent changes regarding active users. In other words, the method further comprises authenticating S21 the user 2. The authentication is typically done via a server user interface 25, which may be a human-machine interface, or a machine-machine interface configured for communication with a user device of the user.

The method is typically initiated by a user. The user may e.g. need to select a specific function such as "access device" or similar. The user will then be requested to enter the challenge that he has obtained from the medical equipment 10. In other words, the method comprises the authorization server receiving S22, from a user 2 via the server user interface 25, an authorization challenge indicative of an equipment public key $Q_A$ of a temporary equipment asymmetric key pair associated with the medical equipment 10.

Based on the challenge and the authentication of the user the authorization server 20 creates a response code. In other words, the method comprises providing S26 to the user 2 via the server user interface 25, a response code comprising validity information encrypted using a shared key $K(Q_B, d_A)$, wherein the shared key is derived in the authentication server 20 using the stored authority private key $d_B$ and the equipment public key $Q_A$. The response code may be used to access, i.e. unlock the medical equipment 10 that generated the challenge, as described above. This will now be explained in further detail.

The received challenge contains (i.e. comprises) the equipment public key $Q_A$ which is combined with the stored authority private key $d_B$ into a shared key K that is used to encrypt a message, the response code, that is returned to the user. In other words, the authentication server 20 generates S23 a shared key using the stored authority private key $d_B$ and the received equipment public key $Q_A$. The authentication server 20 also determines S24 a response code comprising validity information, for example based on the authenticating and possibly also on other parameters comprised in the challenge. These other parameters are for example a device identifier I of the medical equipment 1, an address of the medical equipment 1 or some other information.

The authentication server 20 typically has a lot of data about the users and about different medical equipment. Hence, the medical equipment 10 may determine whether the user is trusted to access a particular medical equipment 10 identified by for example 1 device identifier I or an address comprised in the challenge, or not. Also, in some embodiments, different levels of access are determined based on an access of the authenticated user, the time of the day. In some embodiments, the authorization server 20 is aware of the location of the user. In that case access may only be granted if the user's location corresponds to the location of the medical equipment 10 that the user wants to access. In other words, in some embodiments, the determining S24 comprises determining the response code based on a device identifier I of the medical equipment 1, an address of the medical equipment 1, an authorization level of the user 2, a time parameter and/or a location of the user 2.

The authentication server 20 creates a response code, which comprises pre-agreed validation server and possibly also some additional information. As mentioned above, the information that enables the medical equipment 10 to validate the authentication validity information may be e.g. some information comprised in the challenge, such as the device identifier I of the medical equipment 1 or an address of the medical equipment. Alternatively, it may be some pre-agreed data or data computed by a pre-agreed rule. In addition to the validity information other data may be added to the response code. The other data may inform the medical equipment about the identity or access of the user. For example, the other data may specify access levels or even comprise commercial information that unlocks certain functionality in the medical equipment 10. In one example embodiment, information may be sent that unlocks the medical equipment for certain medical use.

The authentication server 20 then decrypts S25 the determined response code (or at least the validity information) using the generated shared key $K(Q_A, d_B)$ and displays the encrypted response code on the server user interface 25. In some embodiments, the shared key $K(Q_A, d_B)$ is a symmetric crypto and thus the response code does not need to be longer than the original message, e.g. the validity information. Length of data in challenge-response transaction is important when the user has to transfer the messages manually.

As the medical equipment 10 is unaware about the identity of the user, the authentication server has to keep track of the users. Thus, a record of all created response codes should typically be stored in the authentication server 20 together with time stamps and user identification. In this way it is very easy to find out which users have accessed a particular medical equipment 10 and when. In other words, in some embodiments, the method comprises logging S27 information associated with the authentication.

In the protocol described above there is only one key that needs to be protected, i.e. the stored authority private key $d_B$. The public keys are not sufficient to generate the response code, and the equipment public key $d_A$ lives only transiently in the medical equipment 10 and a new equipment asymmetric key pair is generated for each transaction. Disassembly of one medical equipment 10, decompiling the source code and reading all data in internal storage will only reveal the authority public key $Q_B$, which is not enough to penetrate another medical equipment 10 or even penetrate the same medical equipment 10 next time an authentication is performed.

In addition, the proposed method enables and allows transfer of encrypted data from the device to the authority and vice versa, as the key pairs may in practice be used to transfer any information.

The disclosure also relates to a corresponding control arrangement 16 configured to perform any of the aspects of the method described above (FIG. 4). For example, a processor 161 of the control arrangement 16 is configured to execute a computer program stored in the memory 163 to achieve this. Thus, the method referred to herein is typically implemented as a program.

In more particular, the control arrangement 16 is configured to cause the medical equipment 10 to store an authority public key $Q_B$. of an authority asymmetric key pair associated with an authentication server 20 and to provide, to the user 2 via the equipment user interface, an authorization challenge indicative of an equipment public key $Q_A$. of a temporary equipment asymmetric key pair generated in the medical equipment 10.

The control arrangement 16 is also configured to receive from the user 2 via the equipment user interface, a response code comprising validity information encrypted using a shared key derivable from the authority private key $d_B$ of the authority asymmetric key pair and the provided equipment public key $Q_A$, and to authorize the user 2 access to the medical equipment 10, upon the validity information decrypted using the same shared key but derived in the medical equipment 10 using the stored authority public key $Q_B$ and an equipment private key $d_A$. of the temporary equipment asymmetric key pair, being valid.

In some embodiments, the user interface is a human-machine interface, or a machine-machine interface configured for communication with a user device of the user.

In some embodiments, the control arrangement 16 is configured to authorize the user 2 different levels of access depending on information comprised in the response code.

In some embodiments, the control arrangement 16 is configured to authorize the user 2 access to at least one of; authorizing certain access to one or more sessions, unlock the medical equipment for certain usage, authorize temporary non-ordinary use.

In some embodiments, the control arrangement 16 is configured to authorize the access during a certain time period.

In some embodiments, the control arrangement 16 is configured to receive, via the equipment user interface, user input initiating authorization of access to the user 2.

In some embodiments, the control arrangement 16 is configured to annul S8 the temporary equipment asymmetric key pair.

In some embodiments, the medical equipment 10 is offline the authentication server 20.

The disclosure also relates to an authentication server 20 is configured to perform all aspects of the method described above (FIG. 5). For example, the processor 21 of the authentication server 20 is configured to execute a computer program stored in the memory 23 to achieve this.

In more particular, the authentication server 20 is configured to store an authority private key $d_B$ of an authority asymmetric key pair associated with the authentication server 20 and authenticate the user 2. The authentication server 20 is also configured to receive, from a user 2 via the server user interface 25, an authorization challenge indicative of an equipment public key $Q_A$ of a temporary equipment asymmetric key pair associated with the medical equipment 10, and to provide to the user 2 via the server user interface 25, a response code comprising validity information encrypted using a shared key, wherein the shared key is derived in the authentication server 20 using the stored authority private key $d_B$ and the equipment public key $Q_A$.

In some embodiments, the server interface is a human-machine interface, or a machine-machine interface configured for communication with a user device of the user.

In some embodiments, the authentication server is configured to determine the response code based on at least one of; an authorization level of the user 2, a time parameter and a location of the user 2.

In some embodiments, the authentication server is configured to log information associated with the authentication.

Figure 6A:
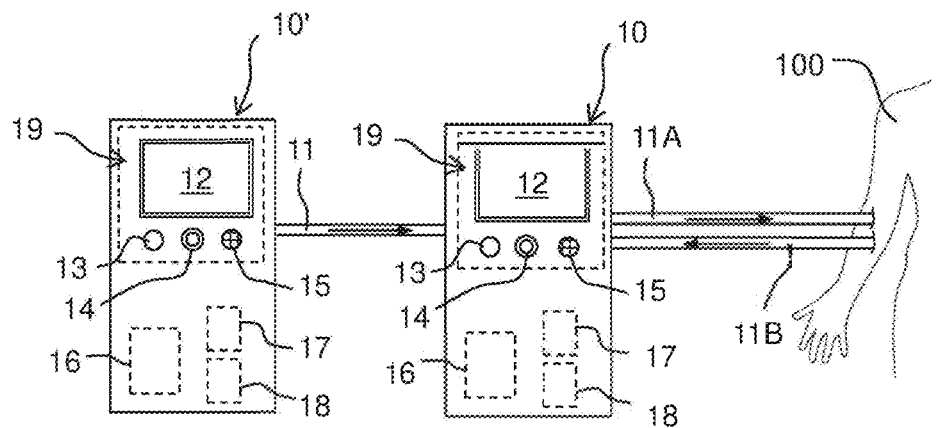
FIG. 6a illustrates an example medical equipment that may implement embodiments of the disclosed technique.

FIG. 6a illustrates medical equipment 10, 10' in which the proposed technique may be implemented. The medical equipment 10, 10' may be involved in a medical procedure of performing extracorporeal blood treatment, e.g. as part of renal replacement therapy, such as hemodialysis, hemodiafiltration, hemofiltration or ultrafiltration. The medical equipment denoted 10 is a blood treatment apparatus, which comprises a blood withdrawal line 11A and a blood return line 11B for connection to the circulatory system of a subject 100, e.g. at a blood vessel access. As indicated by arrows, the medical equipment 10 is operable to withdraw blood from the subject 100 (e.g. a human), process the blood and return the processed blood to the subject 100 in a controlled manner. The medical equipment denoted 10' is operable to prepare a fluid for use by the blood treatment apparatus 10 and comprises a fluid line 11 for supplying the fluid to the blood treatment apparatus 10. In one example, the medical equipment 10' is a water preparation apparatus and the fluid is purified water. For example, the water treatment apparatus 10' may filter incoming water by reverse osmosis as known in the art.

In the illustrated simplified example, the medical equipment 10 comprises a fluid line 11 for connection to the subject 100, an equipment user interface 19, a control arrangement 16, one or more actuators 17 for controlled delivery of the medical fluid to the subject 100 via the fluid line 11, and one or more sensors 18 for providing sensor data indicative of the infusion process performed by an infusion pump. The actuator(s) 17 and sensor(s) 18 may include internal components (as indicated by dashed lines) or external components of the medical equipment 10, or both. The equipment user interface 19 comprises display 12, control buttons 13 (one shown), an indicator lamp 14, and a loudspeaker 15.

The actuators 17 are, for example, configured to control a valve, a pump and/or a heater used while performing the medical procedure. In other words, the actuators 17 are arranged to control the medical procedure.

The control arrangement 16 is configured to coordinate the operation of the actuator(s) 17 and the sensor(s) 18 to perform the intended medical procedure of the blood treatment apparatus, as well as to operate the display 12, the indicator lamp 14 and the loudspeaker 15 as needed in connection with the medical procedure, and to obtain user input via the control buttons 13. For example, the display 12 may be operated to present instructions to the user of the medical equipment 10, the indicator lamp 14 may be operated to indicate a medical equipment status, and loudspeaker 15 may be operated to generate an alarm signal, etc.

The medical equipment 10 is not connected to any remote system. Hence, the medical equipment is offline. In particular it is offline an authorisation system 20 (FIG. 2b).

The medical equipment 10' may have a similar set of components as the medical equipment 10, on the illustrated level of detail, and will not be described further. The medical equipment 10, 10' may comprise more components than illustrated that will not be explained here for brevity.

The medical equipment 10, 10' are involved in a medical procedure of performing extracorporeal blood treatment. Hence, due to patient security, it is very important that only trusted users are allowed to access the medical equipment 10, 10' as such access might endanger future treatments.

Figure 6B:
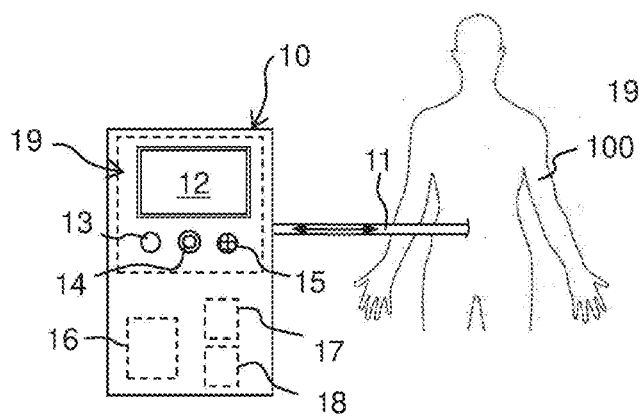
FIG. 6b illustrates another example medical equipment that may implement embodiments of the disclosed technique.

FIG. 6b illustrates another example medical equipment 10 which is operable to, in a controlled manner, deliver a dialysis fluid to the abdominal cavity of a subject 100 and subsequently remove the dialysis fluid therefrom, as indicated by a double-ended arrow. This medical procedure is commonly known as automated peritoneal dialysis, and the medical equipment 10 is often denoted a "PD cycler". The medical equipment 10 in FIG. 6b may have a similar (but typically reduced) set of components compared to the medical equipment 10 in FIG. 6a, on the illustrated level of detail.

Figure 6C:
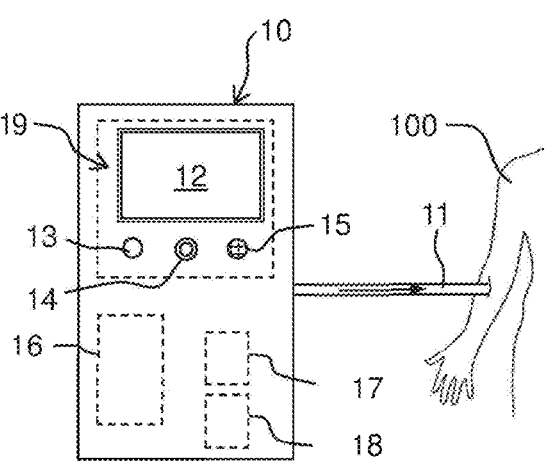
FIG. 6c illustrates a further example medical equipment that may implement embodiments of the disclosed technique.

FIG. 6c illustrates a further example medical equipment 10, which is operable to deliver a medical fluid into the body of a subject 100, such as a human, in a controlled manner, as indicated by an arrow, e.g. into the circulatory system of the subject 100. The medical fluid may be any suitable liquid, including but not limited to medication and/or nutrients. This type of medical equipment 10 is commonly known as an "infusion pump". The medical equipment 10 in FIG. 6c may have a similar set of components as the medical equipment 10 in FIG. 6b, on the illustrated level of detail, and will not be described further. The medical equipment 10 in FIG. 6c may comprise more components than illustrated that will not be explained here for brevity.

The invention claimed is:

1. A method for authorizing user access to medical equipment that is offline from an authentication server via an equipment interface, the method comprising:
storing an authority public key ($Q_B$) of an authority asymmetric key pair associated with the authentication server;
providing, to the user via the equipment interface, an authorization challenge indicative of an equipment public key ($Q_A$) of a temporary equipment asymmetric key pair generated in the medical equipment each time a user wants to access the medical equipment;
receiving, from the user via the equipment interface, a response code comprising validity information encrypted using a shared key derivable from an authority private key ($d_B$) of the authority asymmetric key pair and the provided equipment public key ($Q_A$); and
authorizing, after determining that the validity information is valid, user access to the medical equipment, wherein the validity information is decrypted using the same shared key but derived in the medical equipment using the stored authority public key ($Q_B$) and an equipment private key ($d_A$) of the temporary equipment asymmetric key pair,
wherein the authorizing additionally comprises authorizing the user access during a certain time period and authorizing different levels of the user access depending on information comprised in the response code.

2. The method according to claim 1, wherein the equipment interface is a human-machine interface or a machine-machine interface configured for communication with a user device of the user.

3. The method according to claim 1, wherein the authorizing comprises at least one of:
authorizing certain access to one or more sessions;
unlocking the medical equipment for certain usage; or
authorizing temporary non-ordinary use.

4. The method according to claim 1, further comprising:
receiving user input initiating authorization of access for the user.

5. The method according to claim 1, further comprising:
annulling the temporary equipment asymmetric key pair.

6. Medical equipment comprising:
an equipment interface; and
a control arrangement configured to cause an authentication server to:
store an authority public key ($Q_B$) of an authority asymmetric key pair associated with the authentication server that is offline with respect to the medical equipment, store an authority public key ($Q_B$) of an authority asymmetric key pair associated with the authentication server that is offline with respect to the medical equipment, provide, to a user via the equipment interface, an authorization challenge indicative of an equipment public key ($Q_A$) of a temporary equipment asymmetric key pair generated in the medical equipment each time the user wants to access the medical equipment, receive, from the user via the equipment interface, a response code comprising validity information encrypted using a shared key derivable from an authority private key ($d_B$) of the authority asymmetric key pair and the provided equipment public key ($Q_A$), and authorize, after determining that the validity information is valid, user access to the medical equipment, wherein the validity information is decrypted using the same shared key but derived in the medical equipment using the stored authority public key ($Q_B$) and an equipment private key ($d_A$) of the temporary equipment asymmetric key pair, wherein the processor is configured to authorize the user access by additionally authorizing the user access during a certain time period and authorizing different levels of the user access depending on information comprised in the response code.

7. A system comprising:

a memory; and a processor, wherein the memory stores instructions that, when executed by the processor, cause the processor to:

store, by medical equipment that is offline from communication with an authentication server, an authority public key ($Q_B$) of an authority asymmetric key pair associated with the authentication server;

provide, to a user via an equipment interface of the medical equipment, an authorization challenge indicative of an equipment public key ($Q_A$) of a temporary equipment asymmetric key pair generated in the medical equipment each time the user wants to access the medical equipment;

receive, from the user via the equipment interface, a response code comprising validity information encrypted using a shared key derivable from an authority private key ($d_B$) of the authority asymmetric key pair and the provided equipment public key ($Q_A$); and authorize, after determining that the validity information is valid, user access to the medical equipment, wherein the validity information is decrypted using the same shared key but derived in the medical equipment using the stored authority public key ($Q_B$) and an equipment private key ($d_A$) of the temporary equipment asymmetric key pair, wherein authorizing additionally comprises authorizing the user access during a certain time period and authorizing different levels of the user access depending on information comprised in the response code.

8. A system comprising:

an equipment interface for medical equipment, and a processor configured to:

store an authority public key ($Q_B$) of an authority asymmetric key pair;

provide, to a user via the equipment interface, an authorization challenge indicative of an equipment public key ($Q_A$) of a temporary equipment asymmetric key pair generated in the medical equipment each time a user wants to access the medical equipment;

receive, from the user via the equipment interface, a response code comprising validity information encrypted using a shared key derivable from an authority private key ($d_B$) of the authority asymmetric key pair and the provided equipment public key ($Q_A$); and authorize, after determining that the validity information is valid, user access to the medical equipment, wherein the validity information is decrypted using the same shared key but derived in the medical equipment using the stored authority public key ($Q_B$) and an equipment private key ($d_A$) of the temporary equipment asymmetric key pair, wherein the processor is configured to authorize the user access by additionally authorizing the user access during a certain time period and authorizing different levels of the user access depending on information comprised in the response code.

\* \* \* \* \*